United States Patent [19]
Lauble et al.

[11] Patent Number: 5,887,812
[45] Date of Patent: Mar. 30, 1999

[54] CASSETTE RECORDER THAT CAN TAKE CASSETTES OF VARIOUS SIZES

[75] Inventors: Erhard Lauble; Fritz Weisser, both of St. Georgen, Germany

[73] Assignee: Deutsche Thomson-Brandt GmbH, Villingen-Schwenningen, Germany

[21] Appl. No.: 750,010
[22] PCT Filed: May 5, 1995
[86] PCT No.: PCT/EP95/01709
§ 371 Date: Jul. 28, 1997
§ 102(e) Date: Jul. 28, 1997
[87] PCT Pub. No.: WO95/30987
PCT Pub. Date: Nov. 16, 1995

[30] Foreign Application Priority Data

May 5, 1994 [DE] Germany ............. 44 15 729.0

[51] Int. Cl.⁶ ..................................... G11B 15/00
[52] U.S. Cl. ................................. 242/336; 242/356
[58] Field of Search ............................ 242/336, 356, 242/356.5, 356.6, 356.7; 360/94

[56] References Cited

U.S. PATENT DOCUMENTS 4,664,337  5/1987  Shiratori ........................ 360/94
4,681,281  7/1987  Aarts et al. .
4,729,046  3/1988  Steipe et al. ................... 360/94
4,972,278  11/1990 Hara et al. ..................... 360/94
4,991,043  2/1991  Harumatsu et al. ............. 360/94
5,314,141  5/1994  Ishii et al. ..................... 360/94
5,625,509  4/1997  Matsuoka ...................... 360/94
5,642,246  6/1997  Kletzl et al. ................... 360/94
5,669,569  9/1997  Lee ............................ 242/355.1
5,677,810  10/1997 Lee ............................. 360/94
5,730,380  3/1998  Hong ........................... 242/342

FOREIGN PATENT DOCUMENTS

3327403  4/1985  Germany .

Primary Examiner—John P. Darling
Attorney, Agent, or Firm—Joseph S. Tripoli; Frederick A. Wein

[57] ABSTRACT

A cassette drive mechanism for cassettes wherein cassettes can be played back which have different sizes and for which different tape drive systems are otherwise required. By placing the different cassettes into a common cassette receiving device, the adaptation of the drive and tape scanning systems is automatically carried out at the side of the drive mechanism.

17 Claims, 6 Drawing Sheets

Fig. 9

CASSETTE RECORDER THAT CAN TAKE CASSETTES OF VARIOUS SIZES

BACKGROUND

The invention relates to a cassette recorder which can selectively receive cassettes of various sizes, in which the distance between the winding plates receiving the reels of tape is variable. Such a recorder is known, cf. SMPTE Journal, August 1989, pages 568 to 574.

For selectively receiving cassettes of various sizes or various types of cassette containing a recording medium in tape form, a distance adjustment of the winding plates is provided in the known cassette recorder. The selective driving of the winding-up plate, for example during recording or reproduction of signals, or of the unwinding plate, for example during rewind operation of the device, is performed in each case by a winding plate motor driving the respective winding plate directly.

The invention is based on the object of providing an inexpensive adjustable winding drive.

This object is achieved by the invention specified in claims 1 and 15. Advantageous developments of the invention are specified in the subclaims.

SUMMARY OF THE INVENTION

For the purpose of adapting the distance between the winding plates to the respective rolls of tape of the respective type of cassette, the invention is based on the idea of arranging the two winding plates such that they can swivel about a respective spindle, fixed relative to the drive chassis of the cassette recorder, and, depending on the intended tape-winding direction, of driving the respective winding plate, in engagement with a roll of tape, via a slip clutch.

Such a slip clutch can be realized in a simple way, for example by clutch wheels arranged rotatably on the respective winding-plate swivel spindle. The respective clutch wheels may in this case form part of the gear mechanism between the respective drawing winding plate and a drive motor, or else also act or be used with their clutch Lining as a winding-plate brake.

With such stationary slip clutches, known per se, there is also associated the advantage that, if using a swivel gear mechanism, likewise known per se, having a stationary central wheel and a swivel wheel which can be swivelled about the central wheel spindle and, depending on the intended tape-winding direction, automatically comes into engagement with the one or the other slip clutch, or can be swivelled up against one of the clutch wheels of the respective slip clutch, only one motor is required for the driving of the two winding plates.

It is also conceivable to provide one central clutch instead of the two slip clutches. Such a clutch can be realized in an advantageous way by the swivel gear mechanism.

BRIEF DESCRIPTION OF THE DRAWINGS

A cassette recorder according to the invention is explained below with reference to the drawings, in which.

DESCRIPTION OF THE PREFERRED EMBODIMENTS(S)

It should also be pointed out that mutually corresponding parts are provided with the same reference numerals in FIGS. 1–10.

Figure 1:
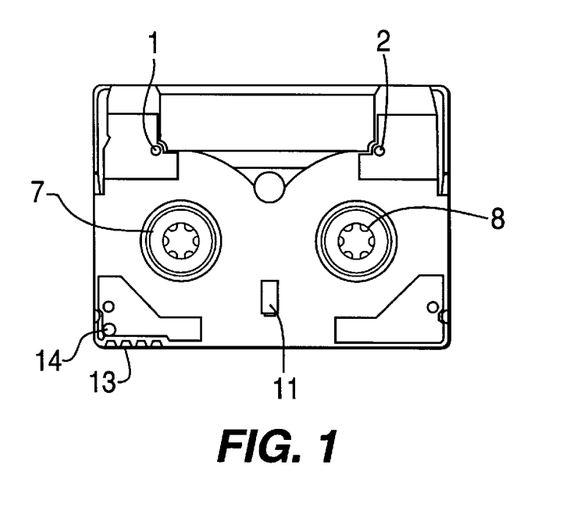
FIG. 1 shows the drive side of a small type of cassette, by which the winding plate spindles arranged rotatably on a drive chassis come into engagement with the rolls of tape of the cassette.

FIG. 1 shows, in a diagrammatic representation, the drive side of an exemplary small type of cassette, which can be operated in the cassette recorder according to the invention without the use of an adapter cassette.

Figures 3, 4:
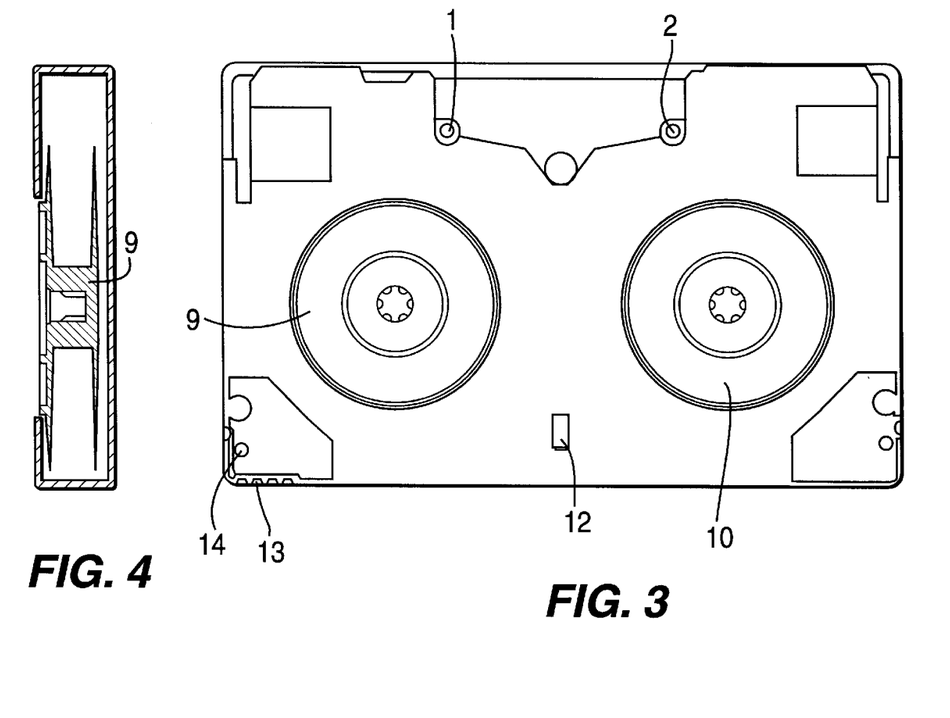
FIG. 3 shows the drive side of the standard type of cassette.
FIG. 4 shows a sectional representation of the standard cassette according to FIG. 3.
Figure 5:
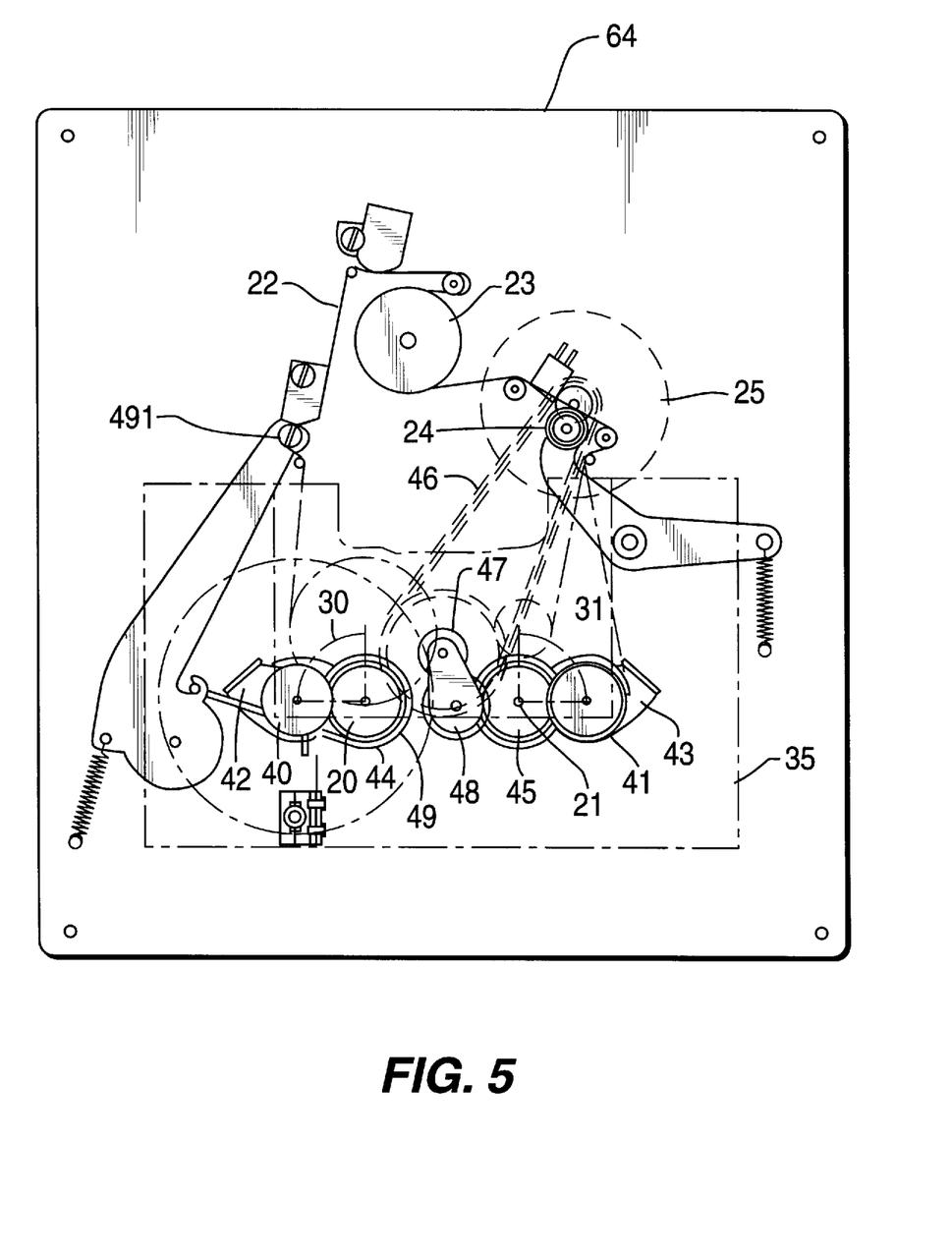
FIG. 5 shows, in a plan view of the drive mechanism, an adjustable winding-plate drive.
Figure 6:
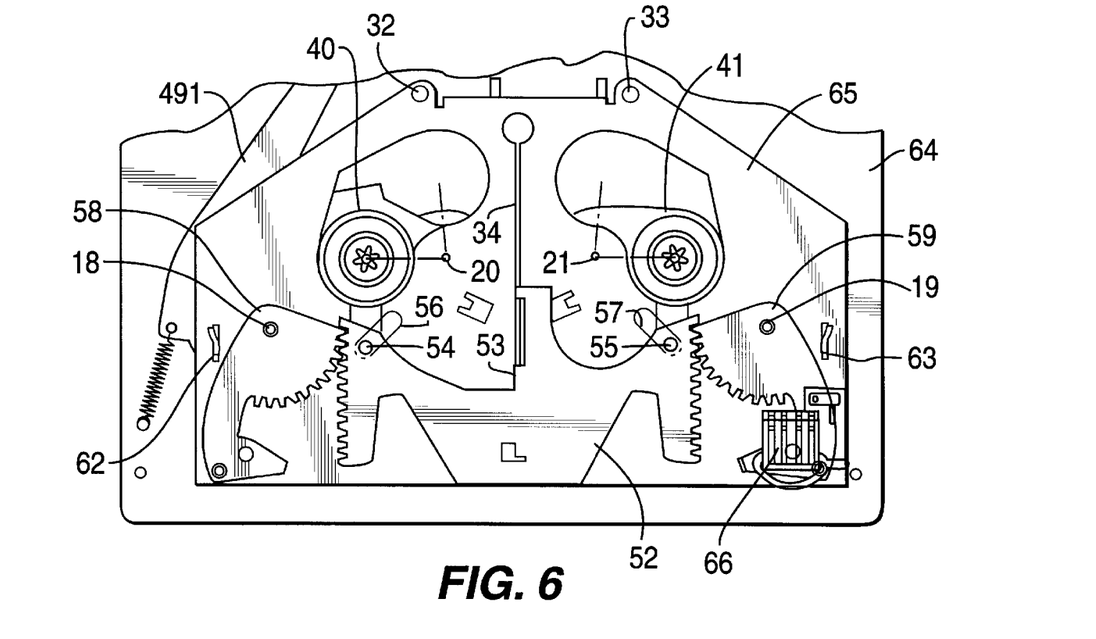
FIG. 6 shows, in a plan view, the tape-winding plates in the operating position intended for the standard type of cassette.
Figure 7:
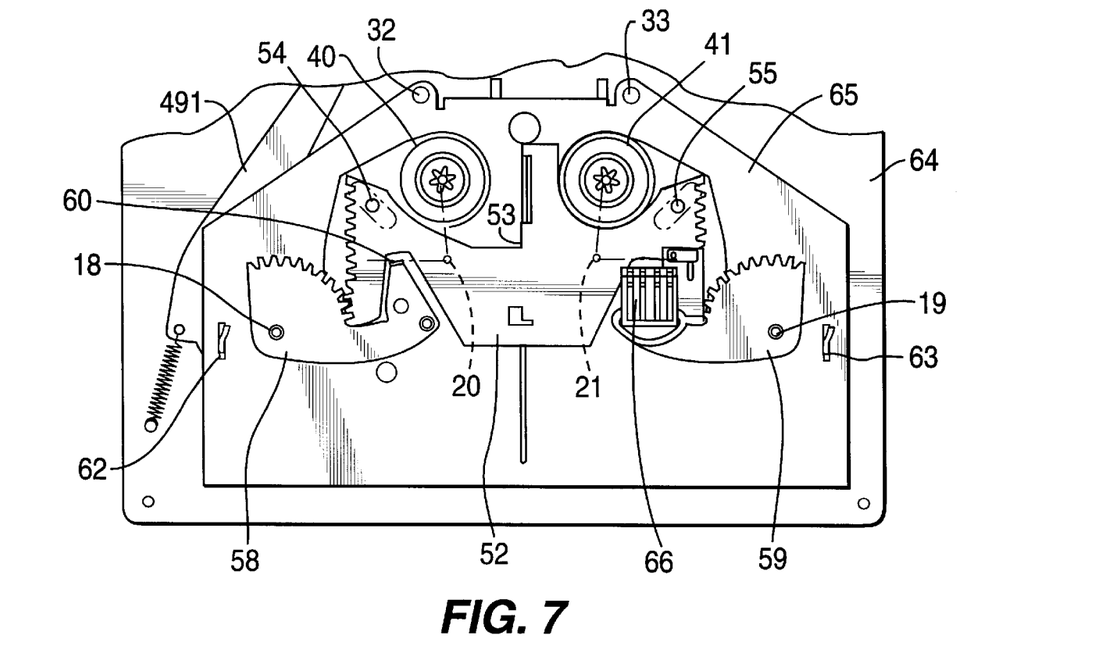
FIG. 7 shows, in a plan view, the tape-winding plates in the operating position intended for the small type of cassette.

As known, the drive side of this type of cassette has, like the larger exemplary standard type of cassette represented in FIG. 3, openings 1, 2 for the cassette centering by means of pins (not shown) and also openings for the engagement of the drive spindle of the respective winding plate 40, 41, shown in FIG. 5–FIG. 7, with the tape-winding element 7, 8; 9, 10 assigned to it, a further opening 11; 12 being provided for the releasing of the two tape-winding elements 7, 8; 9, 10. For protection against unintentional recording over an existing recording, the drive side has a coding opening 14. In addition, connections for a cassette identification may be provided on the rear side of the respective type of cassette.

Figure 2:
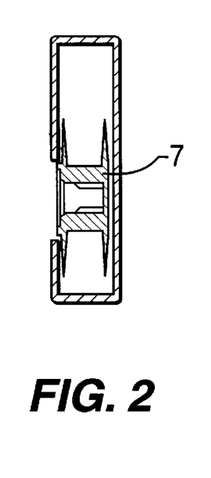
FIG. 2 shows a sectional representation of the cassette according to FIG. 1.

Fig. 2 and FIG. 4 show, in a sectional representation, the tape-winding element 7; 9 of the roll of tape of the respective type of cassette, on the winding-up side.

With these two exemplary types of cassette according to FIG. 1 and FIG. 3, it is intended at the same time to show that the invention is not in any way concerned only with the different types of cassette of a single recorder system standard, such as for example H8 or VHS.

For the operation or the loading of cassettes of different types, there is preferably provided, furthermore, a drawer-like motor-driven loading device, which is not represented. Such loading devices are known, in particular from CD players. Into these is placed a cassette, the already mentioned centring pins coming into engagement with the two centring opens 1, 2, the distance between which is preferably the same in the case of both types of cassette, and thereby providing cassette fixing during the loading operation. During the loading operation, the cassette loading device together with the placed-in cassette is transported into the recorder in a drawing-in movement running essentially parallel to the drive chassis 64 (FIG. 5) and is subsequently lowered over the winding plates 40, 41. Depending on the type of cassette used, in the cassette loading position the two winding plates 40, 41 in this case assume the position shown in FIG. 5 or FIG. 6, or the position shown in FIG. 7, the winding plate position for the small type of cassette being represented in FIG. 7.

FIG. 5 shows, in diagrammatic representation in plan view, the drive chassis 64 of a cassette recorder with adjustable winding-plate drive for the operation of different types of cassette.

The cassette recorder may, for example, be a video recorder with a rotating head drum 23 which, during recording or playback operation, has wrapped around it the recording medium 22 in tape form, mounted in a cassette 35 on reel elements 9, 10. The manner represented in which the recording medium 22 is unthreaded from the cassette 35 and in engagement with the head drum 23 is known as C loading. The driving of the recording medium 22 takes place by means of a pinch roller 24 and the capstan, driven by the capstan motor 25.

The capstan motor 25 is preferably also used at the same time for driving the two winding plates 40, 41. The driving takes place via a fixed central wheel 47, which is driven by belts 46, is in engagement with a so-called swivelling idler wheel 48 and forms with the idler wheel 48 a swivel gear mechanism. Depending on the direction of rotation of the motor 25, either the winding-up plate 41 or the unwinding plate 40 is driven, via a respective slip clutch 44, 45. The engagement of the swivelling idler wheel 48 with the slip clutch 45, which corresponds to the device operating mode of recording, playback or forward search operation, is represented. The structure of the respective fixed slip clutch 44, 45 is described in more detail in FIG. 8. The respective swivelling range of the two winding plates 40, 41 for the operation of the standard type of cassette or the small type of cassette is represented by circle sectors 30, 31.

Since the respective slip clutch 44, 45 is fixed, a tape-tension sensing brake with a braking band 49, acting on the unwinding plate 40 and known in particular from home video recorders, may advantageously be used. During recording or playback operation, the braking band 49 acts on the slip clutch 44 on the unwinding side, this band being controlled in a known way by a tape-tension sensor 491 in engagement with the recording medium 22.

Instead of the capstan motor 25, other motors may also be used for the driving of the swivelling winding plates 40, 41, for example separate motors which drive the winding plates 40, 41 directly, or else also a separate motor which drives the winding plates 40, 41 by means of central wheel 47, idler wheel 48 and slip clutches 44, 45. Such solutions can, for example, be advantageously realized in the case of drive mechanisms in which it is provided to arrange the circuits for the servo and sequence control systems of the drive mechanism on a circuit board, which is then arranged on the drive mechanism, for example underneath chassis 64. In the case of such a drive mechanism, the stator of these motors may also be arranged on the circuit board in a cost-saving way.

FIG. 6 shows, in diagrammatic representation in plan view, the two tape-winding plates 40 and 41, or unwinding plate 40 and winding-up plate 41, in the operating position intended for the standard type of cassette, while FIG. 7 shows the operating position intended for the small type of cassette. As support, fixed supporting points 62, 63 are provided for the standard cassette. The supporting points for the small type of cassette are formed respectively at the end of two swivel levers 58, 59, which are arranged to the sides of the winding plates 40, 41 such that they can swivel on a respective fixed pivot spindle 18, 19 and are in engagement by toothings with a slide 52. Corresponding regions for such supporting points are represented on the drive side of the respective type of cassette according to FIG. 1 and FIG. 3 by faces 3, 4, 5, 6.

By means of the slide 52, which is guided in a guide 34, which is provided in a top plate 65 arranged parallel to the chassis 64, both the position of the two winding plates 40, 41 and the position of the two swivel levers 58, 59 can be correspondingly set for the purpose of adaptation to the different types of cassette. The setting of the two swivel levers 58, 59 is effected by the abovementioned toothings. With the setting of the swivel lever 59 on the winding-up plate side, at the same time cassette identification contacts 66 are adjusted, or swivelled about the fixed pivot axis 19, such that these contacts can come into engagement with the respective cassette identification 13 on the rear side of the cassettes according to FIG. 1 or FIG. 3.

For adjusting the tape-winding plates 40, 41 into the operating position shown in FIG. 7 and back into the operating position shown in FIG. 6, the slide 52 can be mechanically connected to the already mentioned cassette loading device (not represented), so that the slide 52 can be automatically actuated if a cassette of the small type of cassette is placed into the cassette loading device and the loading operation is begun. Such a mechanical connection can be realized in the cassette loading device by simple mechanical means, to be actuated manually or else automatically. As soon as the cassette reaches its respective loading position, i.e. comes into engagement with the winding plates 40, 41, the already mentioned centring pins (not represented), by which the cassette is already fixed during the loading operation, also come into engagement with corresponding positioning openings 32, 33 which are arranged on the top plate 65, and consequently position the cassette on the drive chassis 64.

The swivelling of the winding plates 40, 41 takes place by the slide plate 52, which also contains the winding-reel release 53, with the aid of swivel levers 42, 43 (FIG. 8) bearing the winding plates 40, 41 in that bolts 54, 55, arranged on the slide plate 52, engage into slots 56, 57, which are formed in these swivel levers 42, 43.

Figure 8:
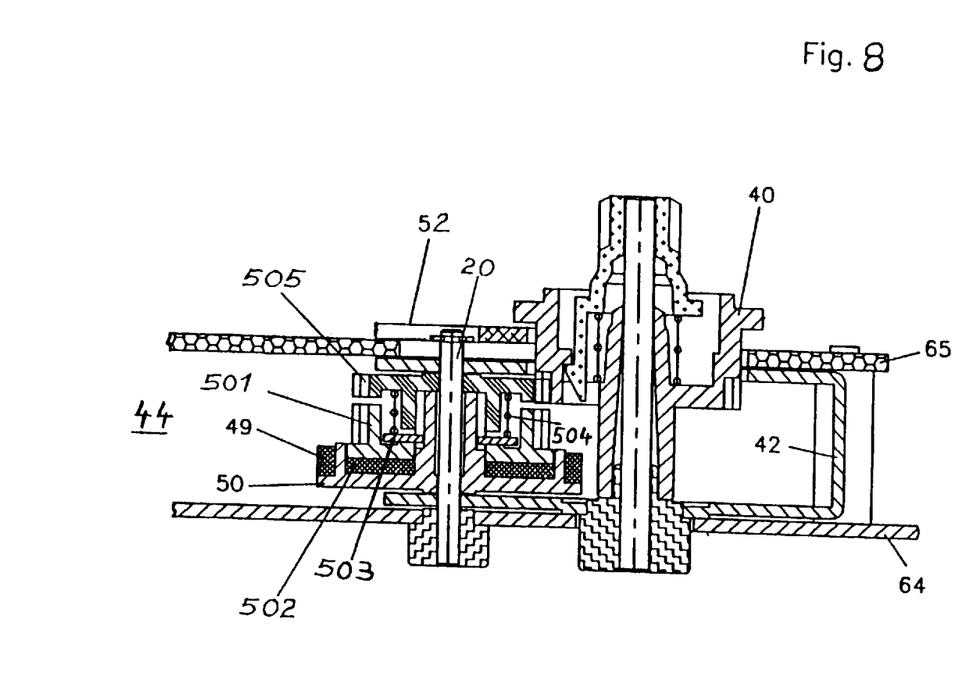
FIG. 8 shows in a sectional representation, in the region on the unwinding plate side, the slip clutch in engagement with the unwinding plate in the operating position intended for the small type of cassette.

FIG. 8 shows in sectional representation, in the region on the unwinding plate side, the slip clutch 44 in engagement with unwinding plate 40, in the operating position intended for the small type of cassette according to FIG. 7.

The slip clutch 44 essentially comprises a first clutch wheel 50, which has the braking band 49 mentioned wrapped around it, a second clutch wheel 501, a preferably felt-like annular first clutch disc 502 between first clutch wheel 50 and second clutch wheel 501, which is in engagement with the swivelling idler wheel 48 by means of toothings when the unwinding plate 40 is driven, and a third clutch wheel 505, which is always in engagement with swivelling unwinding plate 40 by means of toothings, and also a prestressed spiral spring 504 and a second annular clutch disc 503 between second clutch wheel 501 and third clutch wheel 505.

It should be pointed out that, apart from the braking band 49, the representation according to FIG. 8 also applies correspondingly to the region on the winding-up plate side.

The winding-up plate 40 is mounted on a pivotable, swivel lever 42 which is bent in the shape of a U and the pivot point of which is formed by the fixed spindle 20 of the slip clutch 44. Pivotably mounted on the spindle 20 are the clutch elements 50, 501, 502, 503, 504 and 505. By a vertical adjustment (not represented) of the idler wheel 48, the latter can be brought into engagement with the third clutch wheel 505 and transmit the driving torque directly to the winding plate 40.

In addition to the braking band 49, for tape-tension control there may also act on the clutch wheel 50 main and auxiliary brakes (not represented).

Figure 9:
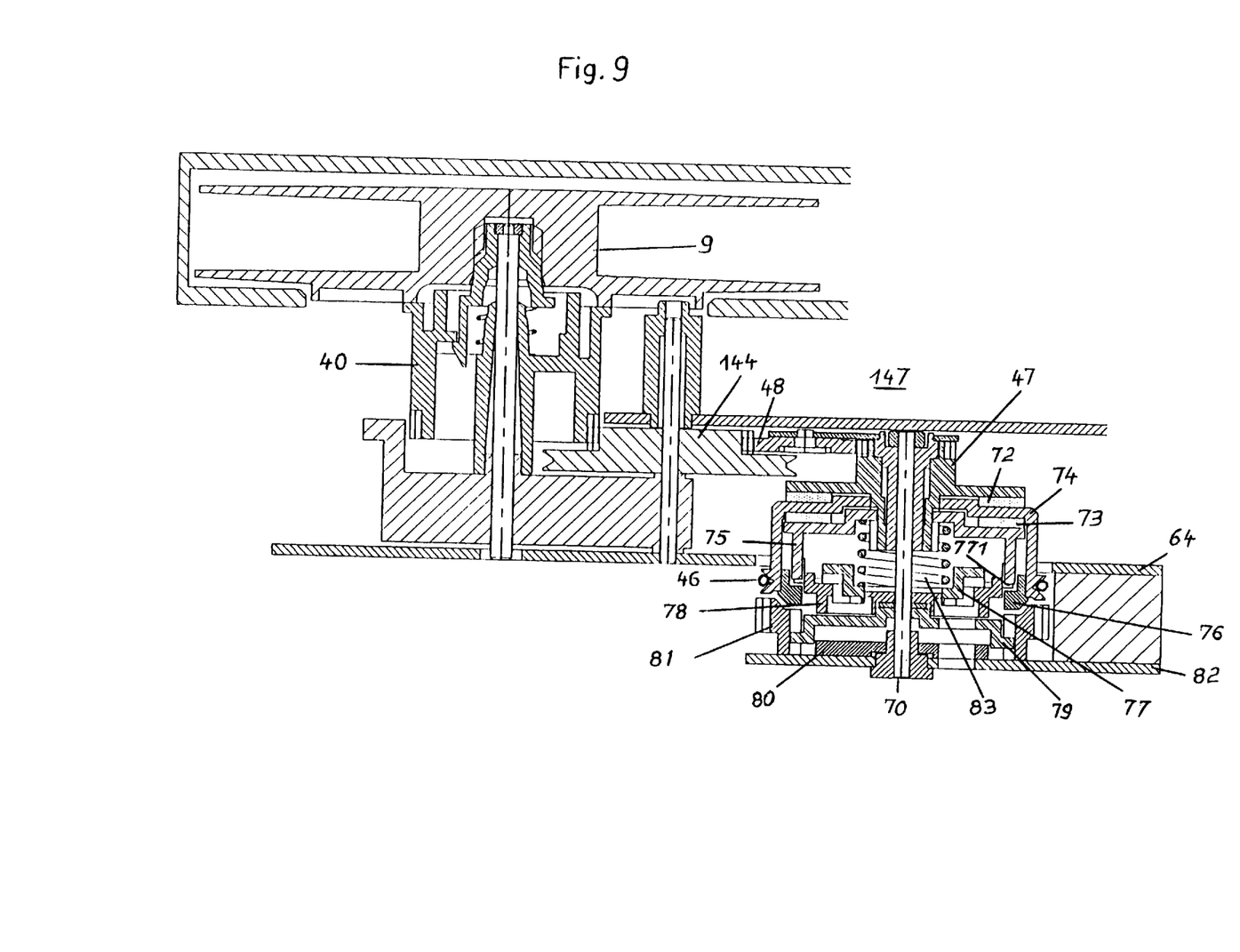
FIG. 9 shows, in a sectional representation, a second exemplary embodiment with a swivel gear mechanism which has a central clutch and is in engagement, via a stationary intermediate wheel, with the swivelling tape-winding plate on the unwinding plate side.

FIG. 9 diagrammatically shows, in sectional representation, a second exemplary embodiment, with a swivel gear mechanism 147, which has a central clutch and is in engagement, via a stationary intermediate wheel 144, with the tape-winding plate 40, which is on the unwinding plate side and can be swivelled about the intermediate wheel spindle.

Figure 10:
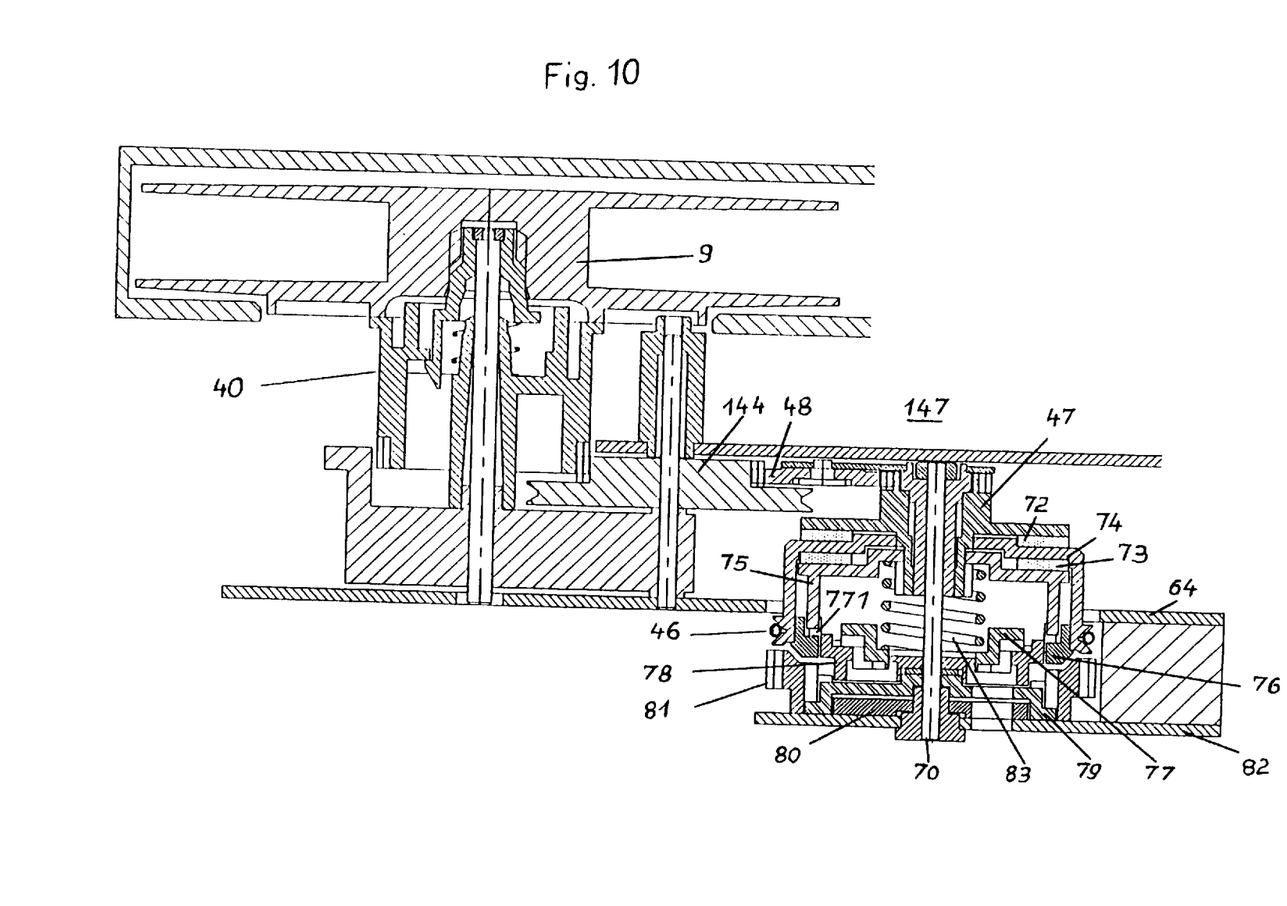
FIG. 10 shows a further sectional representation of the second exemplary embodiment according to FIG. 9.

The second exemplary embodiment differs from the first exemplary embodiment according to FIG. 5 and FIG. 8 essentially only in that, instead of the slip clutches 44, 45, a central clutch in the swivel gear mechanism 147 and intermediate wheels are provided, the operating position for the large type of cassette and the standard type of cassette being represented in FIG. 9 and FIG. 10, respectively, with the intermediate wheel 144 on the unwinding plate side.

The swivel gear mechanism 147 essentially comprises an idler wheel 48, which can be swivelled about the stationary swivel gear mechanism spindle 70, a concentrically arranged central wheel 47, a concentrically arranged cup-shaped drive wheel 74 and a central clutch, which is essentially formed by a concentrically arranged clutch ring 75, a first felt ring 73, arranged between the clutch ring 75 and the cup-shaped drive wheel 74, a second felt ring 72, arranged between the cup-shaped drive wheel 74 and the central wheel 47, a concentrically arranged spiral-shaped compression spring 83, a concentrically arranged adjustment ring 77, a concentrically arranged carrying disc 78, a concentrically arranged driving disc 79, a concentrically arranged lifting cam 80 and a concentrically arranged adjusting ring 81. For the mounting of the swivel gear mechanism 147, there is provided on the drive chassis 64 a carrying plate 82, which is arranged underneath the drive chassis 64 and runs parallel to the latter.

The felt rings 72 and 73 form with the central wheel 47, the drive wheel 74 and the coupling ring 75 a slip clutch, the action of which can be set by means of the adjustment ring 77, which is adjustable in the axial direction of the swivel gear mechanism, by means of the driving disc 79, which is adjustable in the axial direction, and by means of the compression spring 83, which is adjustable in the axial direction. The compression spring 83 is prestressed. The setting of the action of the slip clutch can be used to set, and consequently adapt, the driving torque, for example corresponding to the wound diameter of the roll of tape on the winding-up or drawing tape plate, in order to keep the tape tension in a permissible range during play operation.

The setting of the respective action of the slip clutch, and consequently of the respective driving torque, takes place by turning the adjusting ring 81 and the driving disc 79. The turning, for which preferably a turning range of about 120° is provided, takes place by means of the threading motor (not represented) via a toothed-wheel gear mechanism (likewise not represented), which is in engagement with the corresponding toothing on the outer circumference of the adjusting ring 81. When the adjusting ring 81 is turned, the driving disc 79 is moved, by means of the lifting cam 80 formed in the manner of a ramp on its circumference, together with carrying disc 78 and adjustment ring 77 in the axial direction of the swivel gear mechanism 147, whereby the compression spring 83 is stressed more or less, depending on the direction of movement, so that a torque dependent on the stressing of the compression spring is transmitted to the central wheel 47. In this respect, the "search backward" device operating mode is represented in FIG. 9. With the adjustment ring 77, an adjustment of the slip clutch can be carried out. The adjustment takes place by an adjustment or turning of the adjustment ring 77, which, on account of a ramp-like formation on the carrying disc 78, thereby effects a movement of the adjustment ring 77 in the direction of the swivel gear mechanism spindle 70. As in the case of the first exemplary embodiment according to FIG. 5, the driving likewise takes place by means of the capstan motor 25 via a belt 46, which is in engagement with the cup-shaped drive wheel 74.

For rewinding operation, in which a greater driving torque is required, a bridging of the slip clutch is provided. According to FIG. 10, which shows a further sectional representation of the second exemplary embodiment, the adjustment ring 77 is lowered, by adjustment of the adjusting ring 81, to such an extent that detents 771, which are formed on the said adjustment ring and engage into cutouts of the clutch ring 75, additionally engage into clearances of a blocking ring 76, which is connected in a rotationally fixed manner to the drive wheel 74. Since the coupling ring 75 is guided in grooves formed parallel to the swivel gear mechanism spindle 70 on the shank of the central wheel 47, and the drive wheel 74 is inter-connected with the clutch ring 75 by the detents 771, the driving takes place from the drive wheel 74 via the detents 771 and the clutch ring 75 directly onto the central wheel 47.

As represented in FIG. 9 and FIG. 10, the intermediate wheel 144 on the unwinding side has a circumferential groove, this groove being provided for a braking band 49, which is represented in FIGS. 5 and 8 and serves for the tape-tension control known per se.

We claim:

1. Cassette recorder which can selectively receive cassettes of various sizes, in which the distance between winding plates receiving the reels of tape is variable, comprising the winding plates are the same for the respective cassettes of various sizes, and in each case a winding plate lies with its circumference in contact with the circumference of a slip clutch serving as a drive, and can be swivelled about a pivot spindle of the slip clutch, maintaining its contact with the slip clutch.

2. Recorder according to claim 1, wherein the slip clutch is formed by fixed clutch wheels, which are mounted rotatably on a chassis and has a friction lining.

3. Recorder according to claim 1, wherein between two slip clutches, assigned to the two winding plates, there is mounted a central wheel, which serves as a drive for the winding plates and can be coupled selectively with the first or second slip clutch.

4. Recorder according to claim 3, wherein between the central wheel and the two slip clutches there is mounted an idler wheel in such a way that it can swivel with the effect that it couples the central wheel selectively with the first or second slip clutch.

5. Recorder according to claim 3, wherein the clutch wheel of the slip clutch is assigned a tape-tension sensor with a braking band.

6. Recorder according to claim 1, wherein on a chassis there is displaceably mounted a slide plate, which engages at opposite ends a projection, into a slot of a swivel lever swivel-mounted on the chassis and carrying a winding plate.

7. Recorder according to claim 6, wherein the slide plate is provided at opposite ends in each case with a toothed rack, into which a toothed rim in the form of a pitch circle engages for the swivelling movement of swivel levers swivel mounted on the chassis.

8. Recorder according to claim 7, wherein the swivel lever has an upwardly protruding projection, which forms a supporting point for the placed-in cassette.

9. Recorder according to claim 6, wherein each slide plate has an upwardly pointing projection, which engages into an opening of placed-in cassette housing and serves in a cassette housing for releasing a winding interlock provided there to prevent turning of the reels of tape.

10. Recorder according to claim 1, wherein a central wheel is connected to a capstan motor via a drive belt.

11. Recorder according to claim 1, wherein a central wheel is assigned a separate drive motor.

12. Recorder according to claim 1, wherein the swivelling movement of the winding plate (40, 41) about the slip clutch is about 90°.

13. Recorder according to claim 1, wherein the slip clutches are assigned separate drive motors.

14. Recorder according to claim 1, wherein the slip clutches are assigned a common drive motor that can be brought into engagement selectively with one of the slip clutches.

15. Cassette recorder which can selectively receive cassettes of various sizes, in which the distance between a winding plates receiving the reels of tape is variable, wherein a winding plates are the same for the respective cassettes of various sizes, and in that for driving the winding plates there is provided a swivel gear mechanism, which has a central clutch for torque transmission.

16. Recorder according to claim 15, wherein the central clutch has an adjustable slip clutch for transmitting different driving torques.

17. Recorder according to claim 15, wherein means are provided for bridging a slip clutch.

* * * * *